United States Patent [19]

Tsutsumi et al.

[11] Patent Number: 5,752,094
[45] Date of Patent: May 12, 1998

[54] AUTOZOON APPARATUS FOR CAMERA

[75] Inventors: Motoko Tsutsumi; Minoru Hara, both of Hachioji, Japan; Kenichi Kishida, Kowloon, Hong Kong

[73] Assignee: Olympus Optical Co., Ltd., Tokyo, Japan

[21] Appl. No.: 501,877

[22] Filed: Jul. 13, 1995

[30] Foreign Application Priority Data

Jul. 27, 1994 [JP] Japan .................................. 6-175498

[51] Int. Cl.$^6$ .................................................. G03B 17/00
[52] U.S. Cl. .................................................. 396/76; 396/52
[58] Field of Search .......................... 354/195.1–201, 354/400–409

[56] References Cited

U.S. PATENT DOCUMENTS

| | | | |
|---|---|---|---|
| 3,608,995 | 9/1971 | Humphrey | 350/16 |
| 5,262,867 | 11/1993 | Kojima | 358/209 |
| 5,398,095 | 3/1995 | Tsukamoto et al. | 354/400 |
| 5,537,180 | 7/1996 | Matsumoto et al. | 354/402 |

FOREIGN PATENT DOCUMENTS 63-220118  9/1988  Japan .

*Primary Examiner*—Safet Metjahic
*Assistant Examiner*—Eric Nelson
*Attorney, Agent, or Firm*—David E. Dougherty

[57] ABSTRACT

An autozoom apparatus for a camera having an operating member for designating a first point and a second point in a scene to be photographed; a circuit using an angular velocity sensor for detecting a displacement angle of the camera when the camera is rotated from the first to second points; an autofocus circuit for measuring the object distance; a zoom encoder; a zoom motor; and a circuit for controlling the zoom motor. The autozoom apparatus calculates a focal length corresponding to the picture frame defined by the first and second points and makes automatic zooming to the calculated focal length.

39 Claims, 11 Drawing Sheets

5,752,094

1

AUTOZOON APPARATUS FOR CAMERA

BACKGROUND OF THE INVENTION

1. Field of the Invention

This invention relates to an autozoom apparatus for a camera in which two points defining a picture frame in a viewfinder is inputted by an operating button or the like to determine the focal length of a taking lens for zooming.

2. Description of the Related Art

Generally, with a camera having a zoom lens, a photographer takes a picture after he has made zooming to a desired picture frame while looking into a viewfinder.

Japanese Laid-Open Patent Application Publication No. 63-220118 discloses a camera with autozooming in which the zooming ratio is automatically determined by the camera itself. This camera automatically sets the focal length on the basis of distance measuring information such that the occupying ratio of a main object to the picture frame is a constant value. Thus, a photograph can be taken more quick and properly by this camera than by manual zooming.

In this conventional camera, however, since the occupying ratio of the main object to the picture frame is always set to be constant, there is the drawback that sometimes a landscape (background) desirable to be photographed other than the main object may exceed the picture frame.

SUMMARY OF THE INVENTION

It is therefore an object of the present invention to provide a new and improved autozoom apparatus for a camera which can easily set the focal length for an arbitrary picture frame.

According to an aspect of the present invention, there is provided an autozoom camera with a zoom lens which comprises manual operating means for designating an angle of view of a picture to be taken; displacement detecting means for detecting a spatial displacement of the camera when the manual operating means is operated; focal length determining means for determining the focal length of the zoom lens on the basis of the amount of displacement detected by the displacement detecting means; and driving means for driving the zoom lens on the basis of the focal length determined by the focal length determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

2

Figure 2:
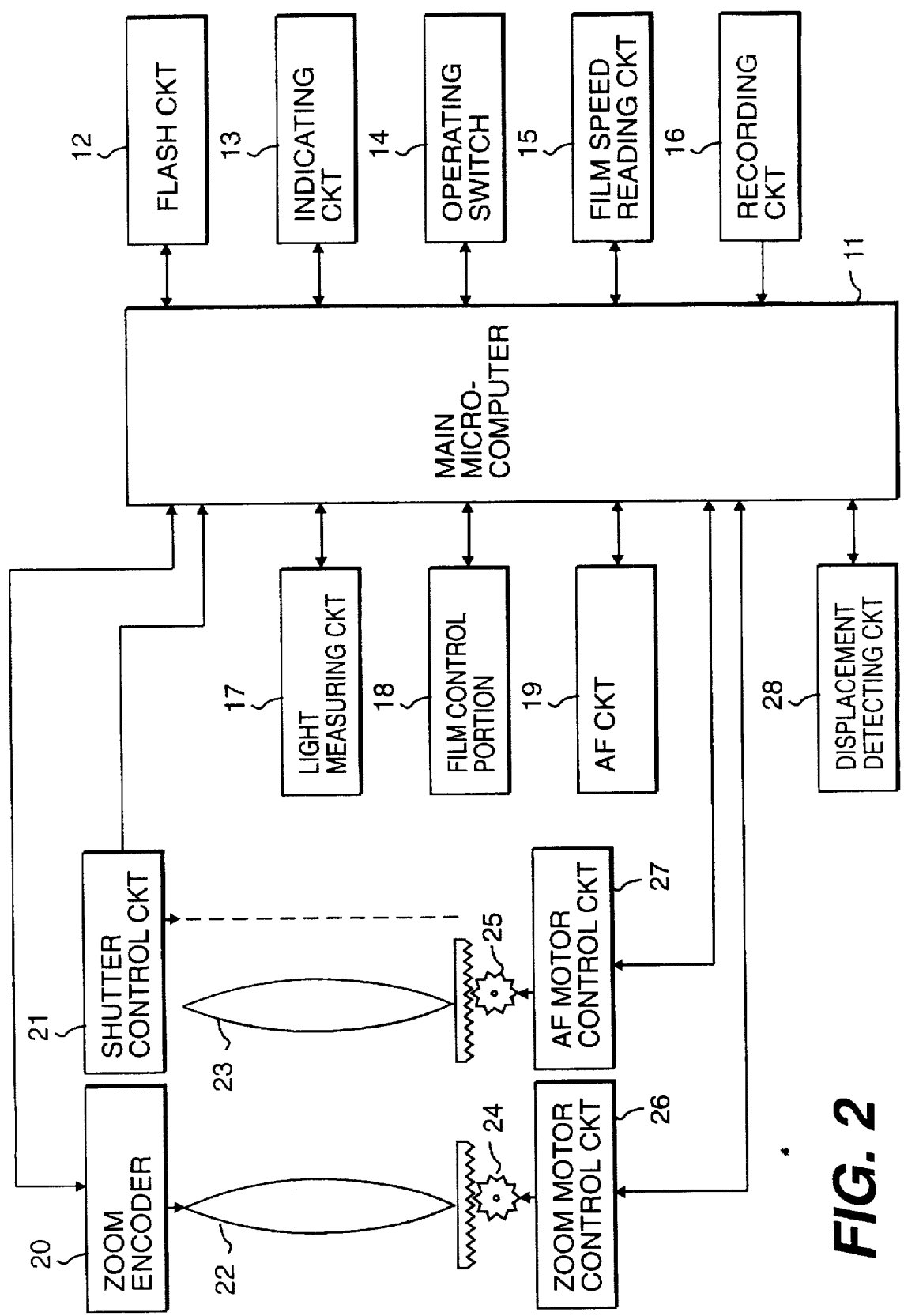
FIG. 2 is a block diagram showing a structure of an autozoom apparatus for a camera according to an embodiment of the present invention.
Figure 4:
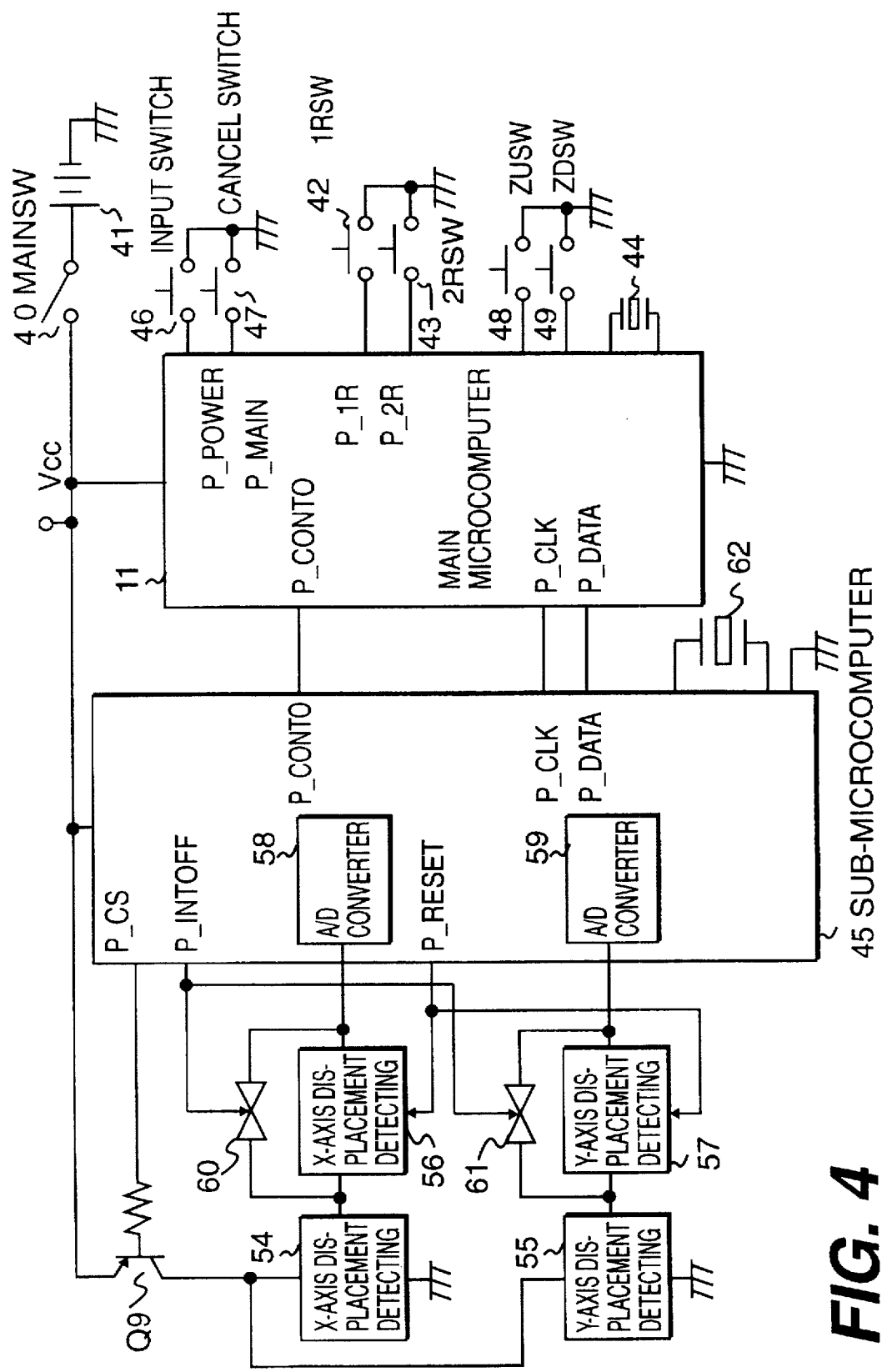

FIG. 4 is a block diagram showing a structure of the displacement detecting circuit shown in FIG. 2.

Figure 5:
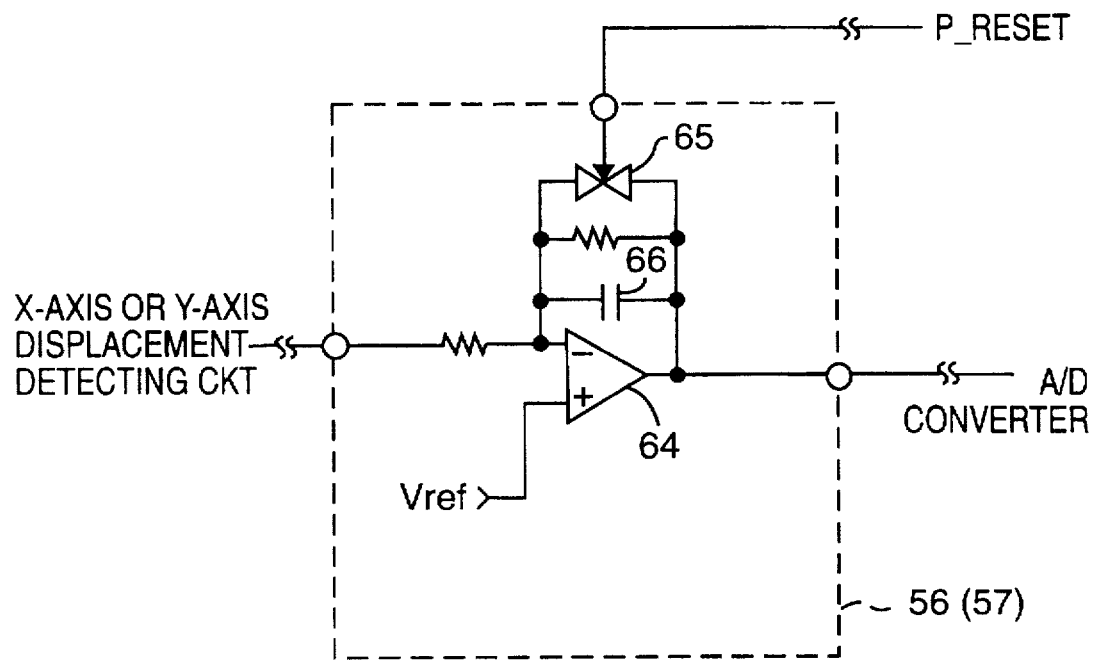

FIG. 5 is a circuit diagram showing a structure of the x-axis displacement integrating circuit and the y-axis displacement integrating circuit shown in FIG. 4.

Figure 6:
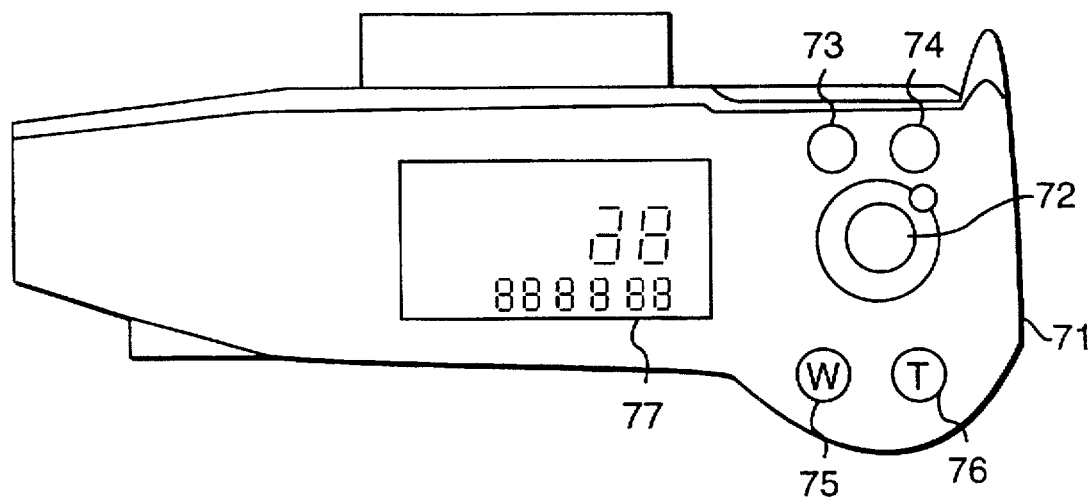

FIG. 6 is a top view of a camera in which the autozoom apparatus of the present embodiment is mounted.

Figure 7:
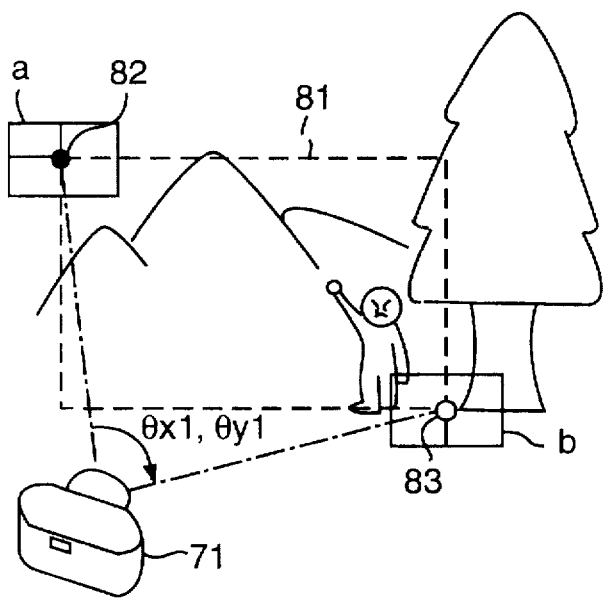

FIG. 7 is an illustration showing a scene to be photographed by using the autozoom apparatus of the present embodiment.

Figure 8:
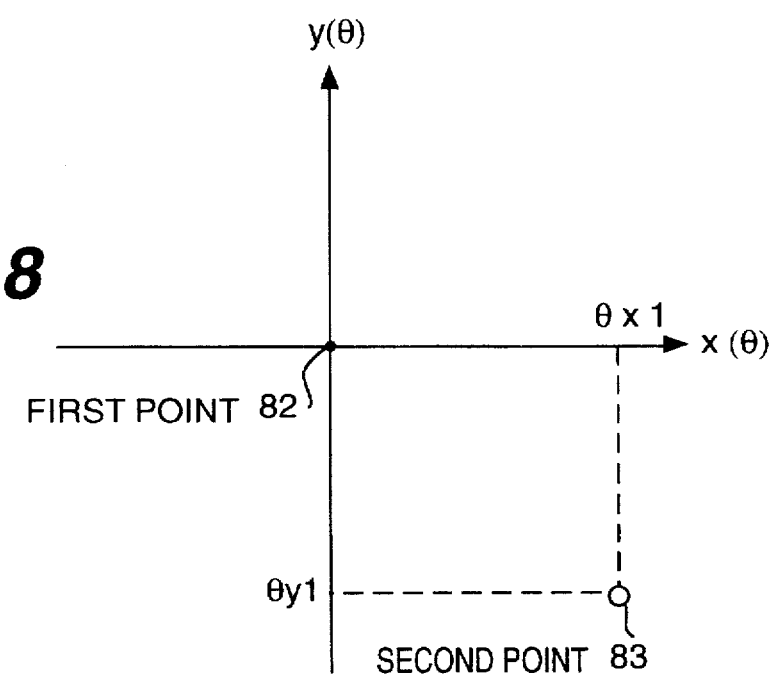

FIG. 8 is a diagram showing a coordinate system with a picture frame designated by coordinates.

Figure 9:
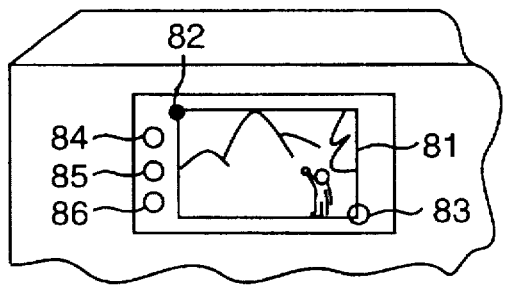

FIG. 9 is an illustration showing a scene in a viewfinder after zooming.

Figure 10:
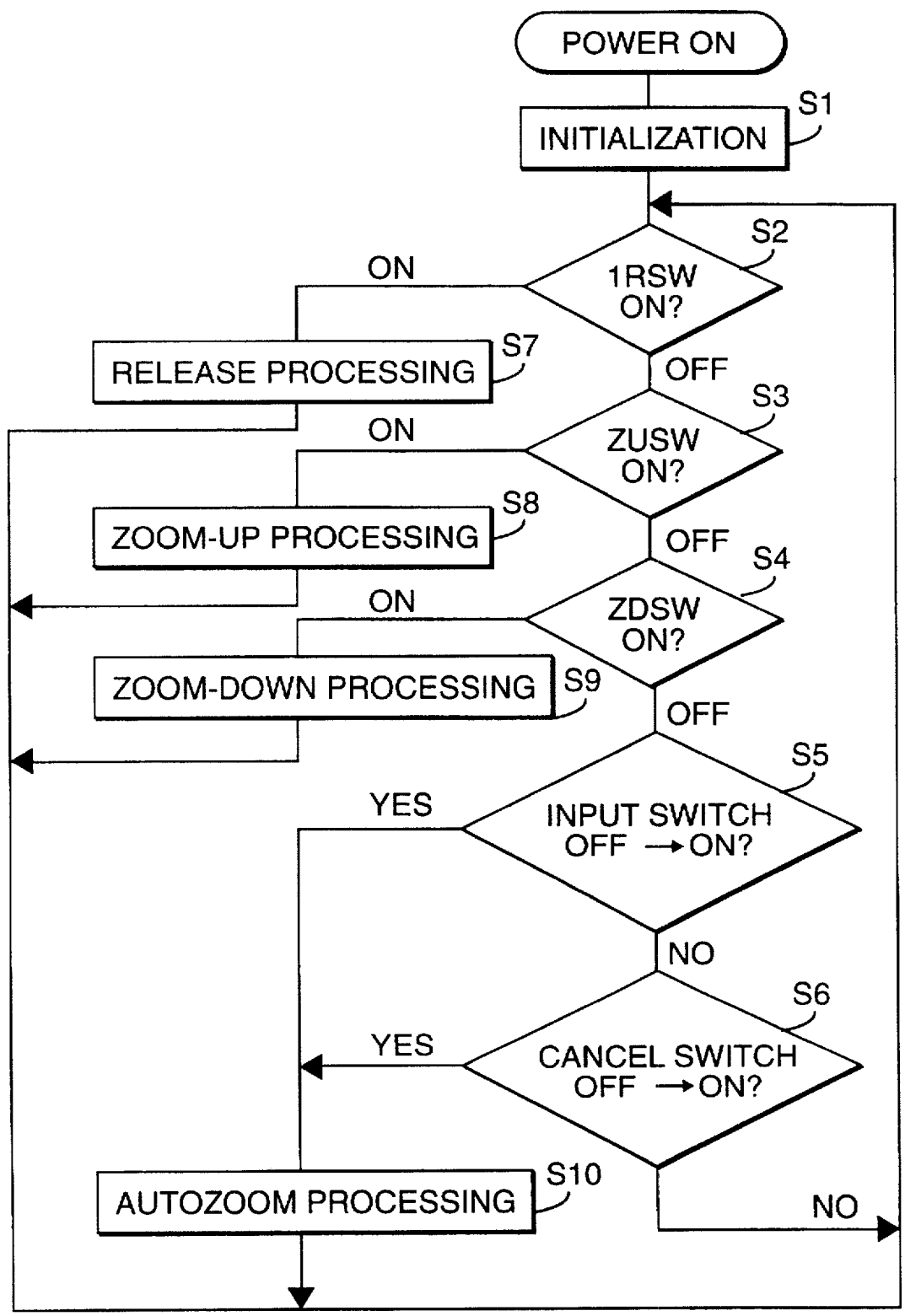

FIG. 10 is a flowchart for explaining a zooming operation of the autozoom apparatus of the present embodiment.

Figure 11:
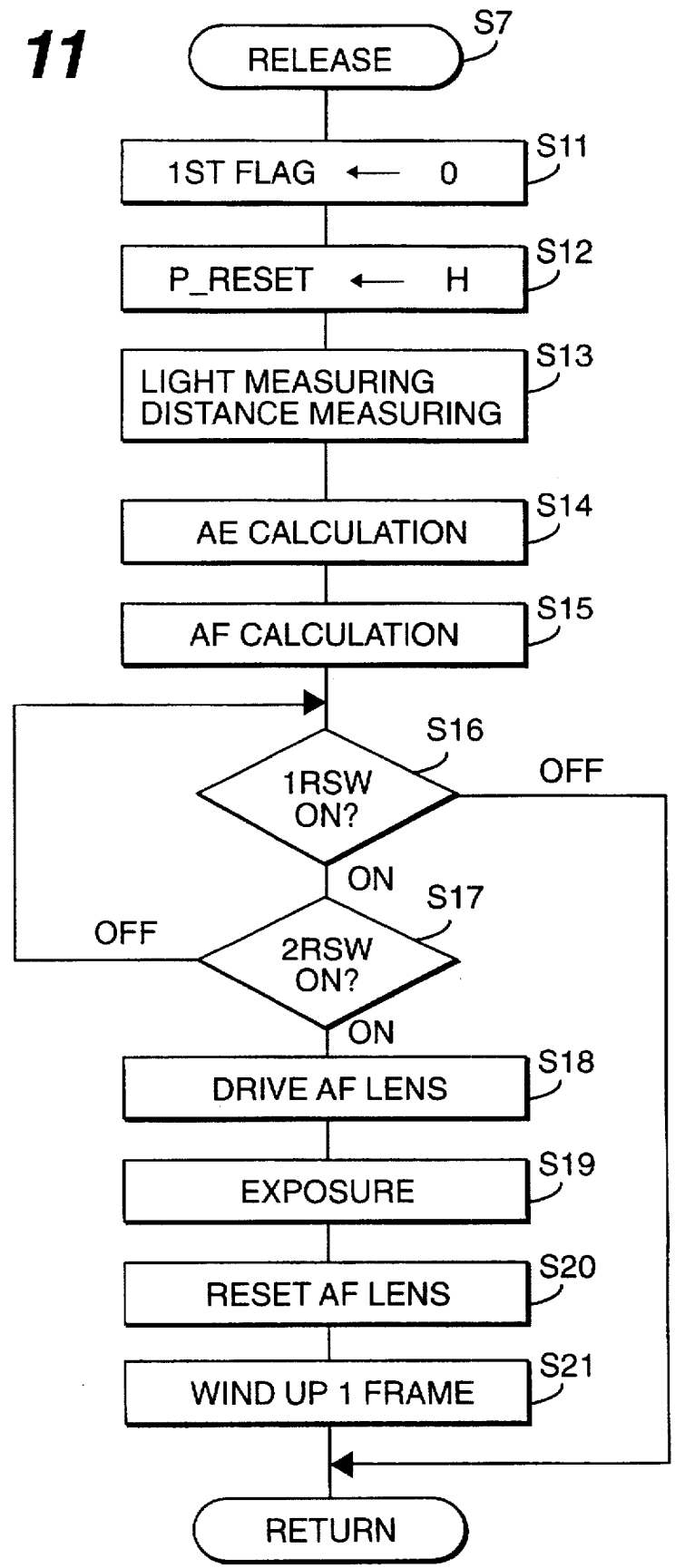

FIG. 11 is a flowchart for explaining the release processing operation in FIG. 10.

Figure 12A:
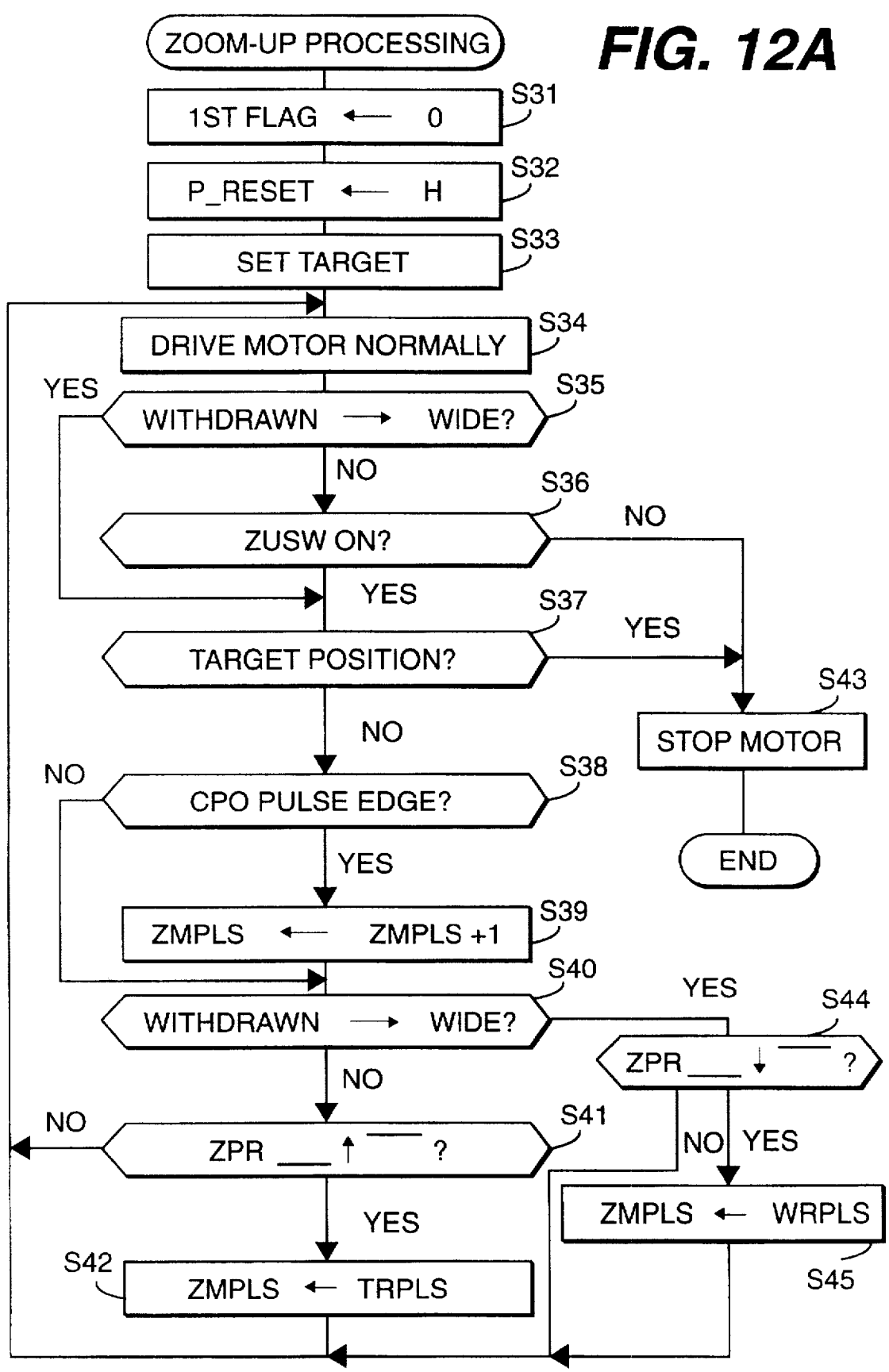
Figure 12B:
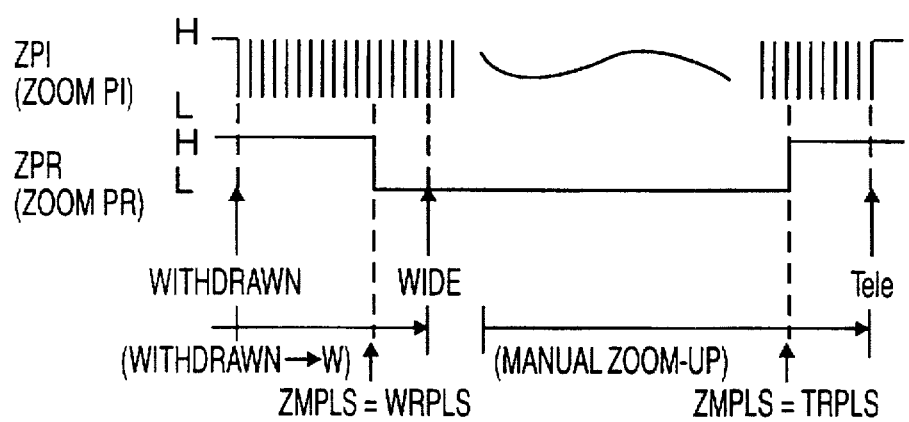

FIG. 12A is a flowchart for explaining the zoom-up processing operation in FIG. 10, and FIG. 12B is a graph showing a relationship between the output signals, counter value, and actual zoom positions mentioned with reference to FIG. 12A.

Figure 13B:
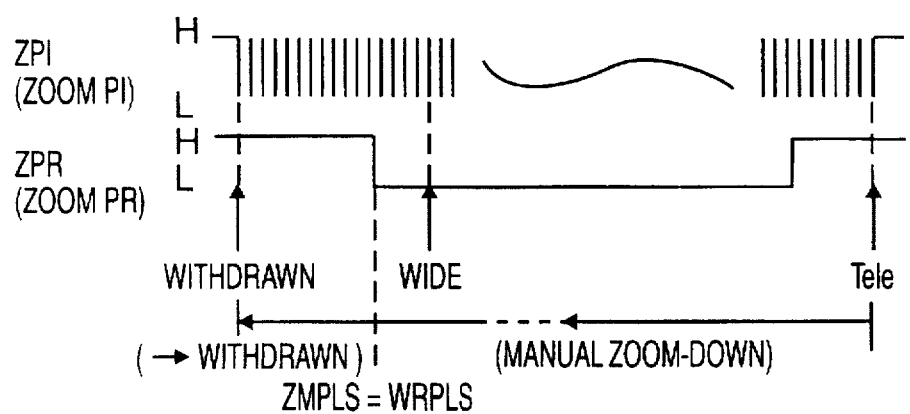
Figure 13A:
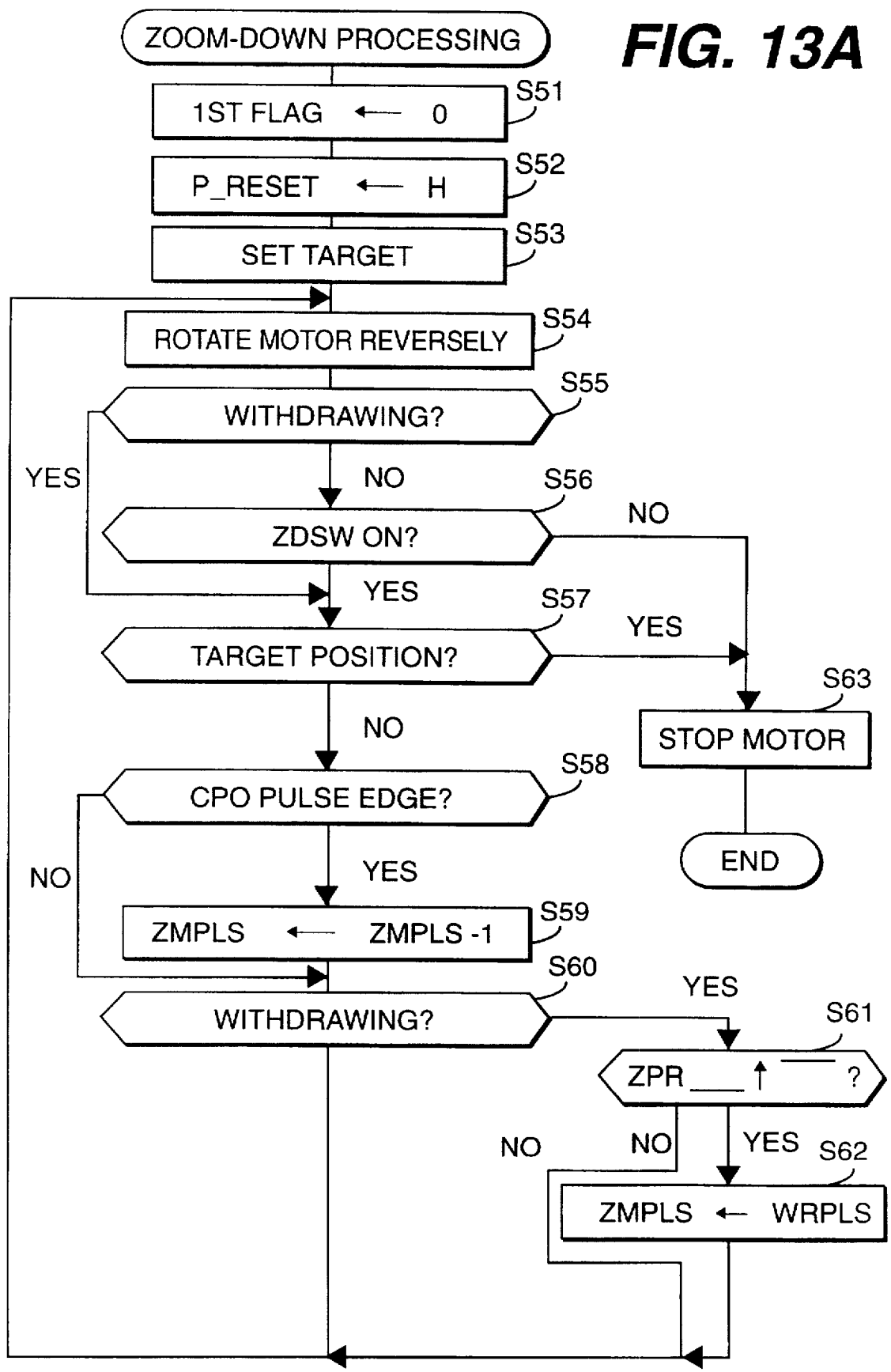

FIG. 13A is a flowchart for explaining the zoom-down processing operation in FIG. 10, and FIG. 13B is a graph showing a relationship between the output signals, counter value, and actual zoom positions mentioned with reference to FIG. 13A.

Figure 14:
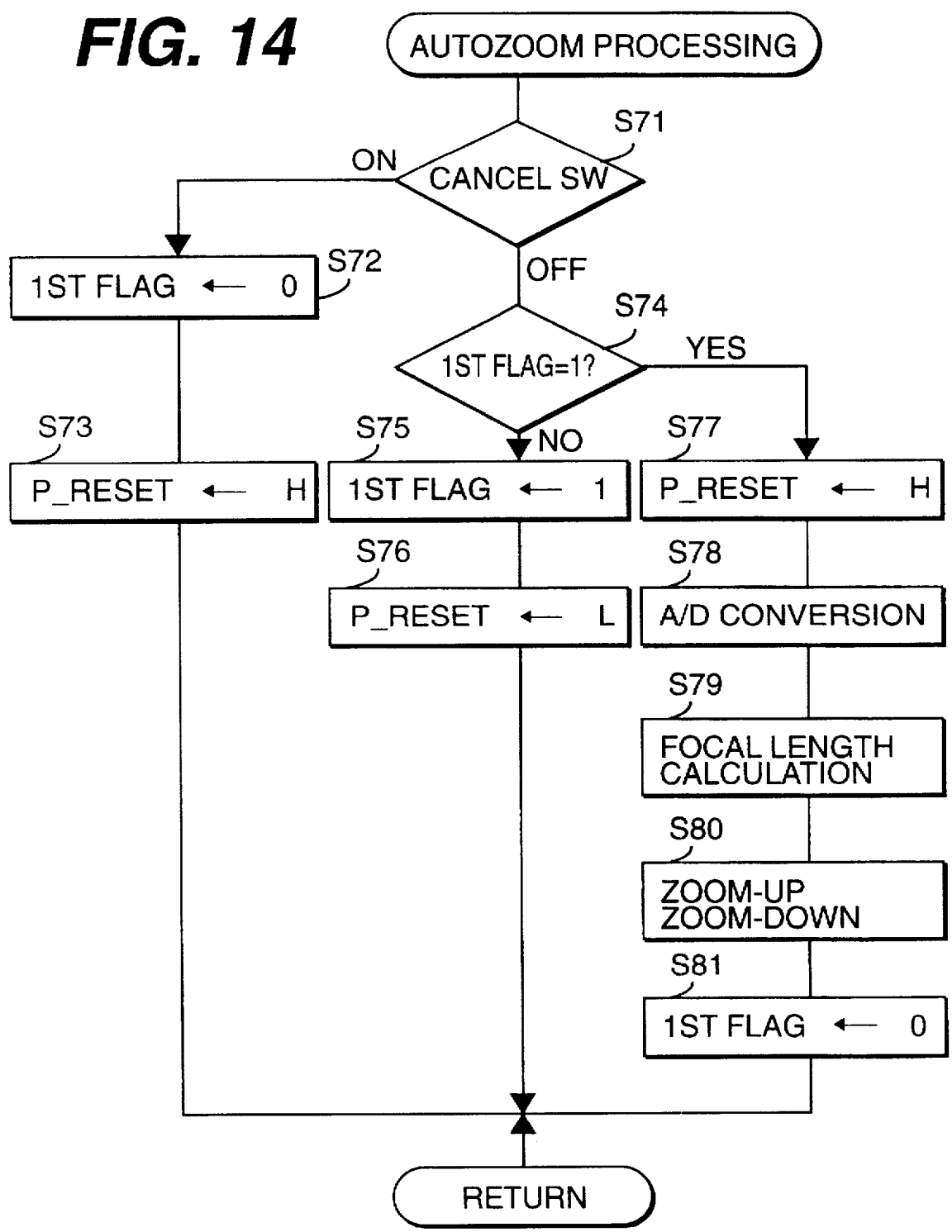

FIG. 14 is a flowchart for explaining the autozoom processing operation in FIG. 10.

DETAILED DESCRIPTION OF THE PREFERRED EMBODIMENTS

Reference will now be made in detail to a presently preferred embodiment of the invention as illustrated in the accompanying drawings.

Figure 1:
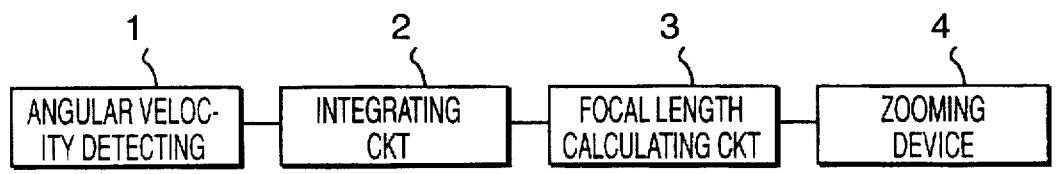
FIG. 1 is a block diagram showing a schematic structure of an autozoom apparatus for a camera according to the present invention.

FIG. 1 shows a schematic structure of an autozoom apparatus for a camera according to the present invention.

This autozoom apparatus comprises an integrating circuit 2 for integrating an output of an angular velocity detecting circuit (angular velocity sensor) 1, the output corresponding to the angle through which the camera is swung, a calculating circuit 3 for calculating a focal length on the basis of the detected angle, and a zooming device 4 for automatic zooming on the basis of the output from the focal length calculating circuit 3.

The angular velocity is once integrated to become an angular displacement signal, on the basis of which the inclined angle of the camera can be detected.

With the autozoom apparatus so constructed, the amount of rotational displacement of the camera is detected when two points of a desired picture frame are designated, and the focal length is calculated to perform zooming. Thus, the zooming to a necessary focal length can be made by merely setting the picture frame.

Incidentally, there have been recently developed many shake compensating cameras which have a camera shake detecting circuit and a camera shake compensating circuit. The most popular sensor as a means for detecting the camera shake is an angular velocity sensor. This sensor detects the angular velocity of the camera to drive the taking lens in the direction canceling the detected angular velocity (camera shake) for compensating the camera shake. If such an angular velocity sensor of the shake compensating camera is used also for the embodiment of the present invention, it is not necessary to add a new sensor.

In the present invention, since it is sufficient to detect the swing angle of the camera, not only an angular velocity sensor, but also an angular acceleration sensor or a displacement angle sensor may be used. In the latter case, the integrating circuit is modified accordingly.

FIG. 2 shows a structure of an autozoom apparatus for a camera according to an embodiment of the present invention. This embodiment uses an angular velocity sensor, calculates the angle through which the camera is swung, calculates the angle of view of a picture to be taken, and performs automatic zooming.

The autozoom apparatus comprises a main microcomputer 11 for executing the sequence control of the entire camera and various calculations; a flash circuit 12 for charging a capacitor to emit flash light and for controlling flash light emission; an indicating circuit 13 including a light emitting diode for indicating an operation mode, the number of frames, the state of a battery, date, etc. in the viewfinder; an operating switch 14 including a first release switch, a second release switch, an input switch, a cancel switch, etc.; a film speed reading circuit 15 for reading the DX code of a film cartridge and outputting the speed information to the main microcomputer; a light measuring circuit 17 for measuring the luminance of an object to be photographed; a film control portion 18 for automatic winding and rewinding and free winding-up of the film; an autofocus (AF) circuit 19 for measuring the object distance; a zoom encoder 20; a zoom motor 24; and a zoom motor control circuit 26. When a zoom switch of the operating switch 14 is operated, the zoom motor control circuit 26 causes the zoom motor to drive a taking lens 22 back and forth for zooming.

Furthermore, the autozoom apparatus comprises a shutter control circuit 21, an autofocus (AF) motor 25, and an autofocus (AF) motor control circuit 27. The AF motor control circuit 27 is driven for focusing on the basis of the value of the AF circuit 19. The shutter speed is calculated on the basis of the data of the light measuring circuit 17 and the film speed reading circuit 15, and the exposure is controlled by the shutter control circuit 21. Moreover, there are provided a recording circuit 16 comprising, for example, a magnetic head for magnetic recording on a film to which a magnetic material is applied; and a displacement detecting circuit 28 for detecting the displacement angle of the camera by using an angular velocity sensor. The recording circuit 16 magnetically records the rotation angle detected by the displacement detecting circuit 28 and the focal length information detected by the zoom encoder 20.

Figure 3A:
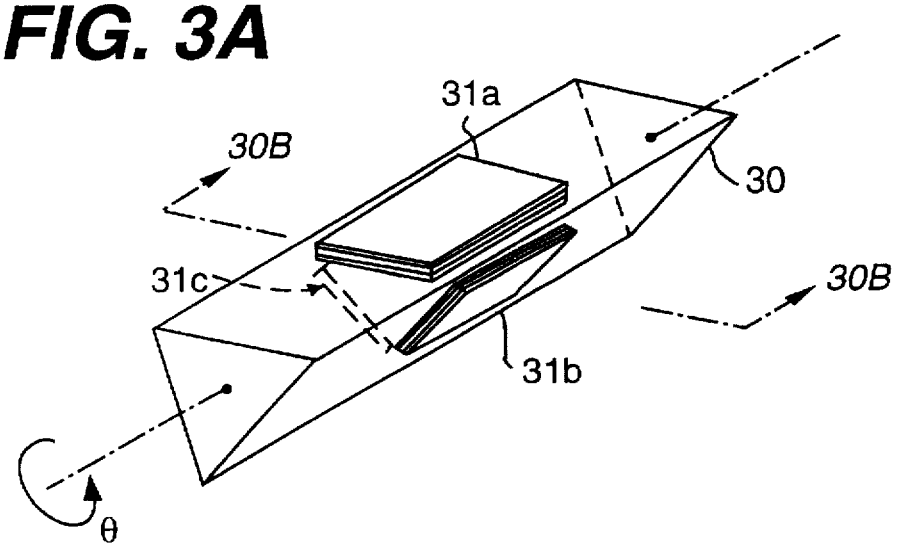
FIGS. 3A and 3B are illustrations showing an angular velocity sensor mounted in the camera according to the present embodiment.
Figure 3B:
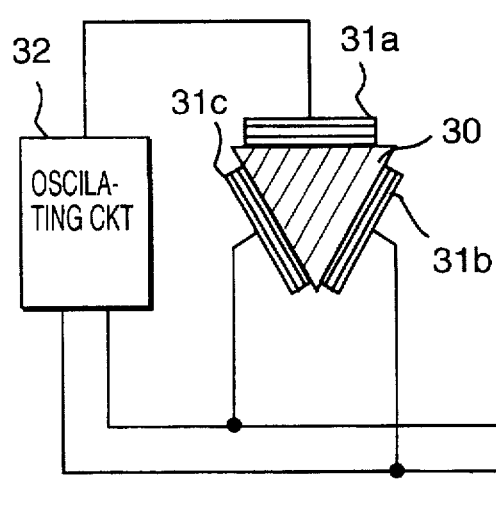

Next, as an example of an angular velocity sensor mounted in the camera according to the present embodiment, FIGS. 3A and 3B show a vibration gyro using a vibrating member in the form of a regular triangle pole.

This angular velocity sensor is provided on its one side with a piezoelectric element 31a for driving and on the other two sides with piezoelectric elements 31b and 31c for feedback. An oscillating circuit 32 is electrically connected between the piezoelectric elements 31b and 31c for feedback and the piezoelectric element 31a for driving, and the outputs of the piezoelectric elements 31b and 31c for feedback are fed back to the piezoelectric element 31a for driving via the oscillating circuit 32 whereby the vibrating member 30 vibrates with self-excitation.

The difference between the output voltages of the piezoelectric elements 31b and 31c for feedback is proportional to the angular velocity of the vibrating member 30, $d\theta/dt$, and detected by a differential circuit 33. When the angular velocity $d\theta/dt=0$, the output of the differential circuit 33 must be zero. Actually, however, since an offset signal is outputted, the output of the differential circuit 33 is the superimposition of the signal due to camera shake and the offset signal.

The signal due to camera shake is of about 1–10 Hz. A high-pass filter 34 is to separate the signal due to camera shake from the offset signal completely. For that purpose, the cutoff frequency of the filter 34 must be set to about 0.1 Hz.

FIG. 4 shows a structure of the displacement detecting circuit 28.

A main switch 40 is a switch for controlling the power supply for the camera. When the main switch 40 is turned on, the power of a battery 41 is fed to the system, and the main microcomputer 11 is powered on and reset and starts its operation.

A first release switch 42 and a second release switch 43 are switches coupled with a release button. When a first designated point is positioned at the center of the viewfinder and an input button 73 (mentioned below) is pushed down, an input switch 46 is turned on and the first designated point is determined. Then, when the center of the viewfinder is moved to a second designated point and the input button 73 is pushed down, the input switch 46 is turned on again and the second designated point is determined. An oscillator 44 outputs an operation clock for the main microcomputer 11.

The main microcomputer 11 is connected to a sub-microcomputer 45, which determines the focal length on the basis of the amount of displacement from the first to second designated point. The sub-microcomputer 45 operates on the basis of a control signal outputted from an output port P_CONTO of the main microcomputer 11. The main microcomputer 11 and the sub-microcomputer 45 are coupled to each other at P_CLK and P_DATA via serial communication lines. Commands are transmitted from the main microcomputer 11 to the sub-microcomputer 45 via the P_DATA line to instruct the operations of an x-axis displacement integrating circuit 56, a y-axis displacement integrating circuit 57, an analog-to-digital (A/D) converters 58 and 59, etc.

The amounts of displacement with respect to the x-axis and the y-axis are detected by an x-axis displacement detecting circuit 54 and a y-axis displacement detecting circuit 55, respectively. The detecting circuits 54 and 55 are formed out of respective angular velocity sensors, and the power for the detecting circuits 54 and 55 is fed via a transistor Q9, which is controlled by an output of an output port P_CS.

The outputs of the x-axis displacement detecting circuit 54 and the y-axis displacement detecting circuit 55 are inputted to the A/D converters 58 and 59 in the sub-microcomputer 45 via the x-axis displacement integrating circuit 56 and the y-axis displacement integrating circuit 57. The displacement integrating circuits 56 and 57 are short-circuited by turning on analog switches 60 and 61, respectively so that the outputs of the x-axis displacement detecting circuit 54 and the y-axis displacement detecting circuit 55 can be directly inputted to the A/D converters 58 and 59.

The analog switches 60 and 61 are turned on by putting an output port P_INTOFF to a high level "H". The x-axis displacement integrating circuit 56 and the y-axis displacement integrating circuit 57 are initialized by putting an output port P_RESET to a high level "H". An oscillator 62 outputs an operation clock for the sub-microcomputer 45.

Additionally, there sre provided a cancel switch 47, a zoom-up switch 48, and a zoom-down switch 49.

FIG. 5 shows a structure of the x-axis displacement integrating circuit 56 and the y-axis displacement integrating circuit 57. The same circuitry is used for both integrating circuits. $V_{ref}$ represents a standard voltage, and an operational amplifier 64 is an ordinary amplifier for integrating operation.

When the output port P_RESET is put to a high level "H", an analog switch 65 is turned on to discharge a capacitor 66 of the integrating circuit for initialization.

FIG. 6 is a top view of a camera in which the autozoom apparatus of the present embodiment is mounted. A camera body 71 is provided with a release button 72, an input button 73, and a cancel button 74.

FIG. 7 shows a scene which a photographer wishes to photograph. If the picture frame selected by the photographer is the area enclosed by the dashed line 81, the center of the viewfinder is located at a corner point of the picture frame 81 and the input button 73 is pushed down to set a first designated point 82. Then, when another corner point diagonally opposite to the first designated point 82 is set as a second designated point 83 by pushing down the input button 73, the displacement from the first to second designated point is determined as displacement angles $\theta_{x1}$ and $\theta_{y1}$ in the directions of the x-axis and the y-axis, respectively by the angular velocity sensor.

Additionally, the camera body 71 in FIG. 6 comprises a zoom-down switch 75, a zoom-up switch 76, and a liquid crystal display 77.

FIG. 8 shows the displacement from the first to second designated point in a coordinate system with the first designated point positioned at the origin.

The determined displacement angles $\theta_{x1}$ and $\theta_{y1}$ are compared to each other and the larger displacement angle is selected as the photographing area $\theta$. The selected $\theta$ is converted to the focal length and zooming is made in accordance with the converted focal length. The photographer can confirm the picture frame 81 in the viewfinder. If the picture frame corresponds to the intent of the photographer, the release button is pushed to open the shutter. Otherwise, the cancel switch 74 is pushed to cancel the zooming value and the setting can be repeated from the beginning.

If the focal length calculated by the above method is beyond the tele or wide position, the autozoom apparatus has a function of indicating the limit of the focal length by a light emitting diode, an alarm sound or the like. The alarm sound can be easily produced by a piezoelectric ceramic element or the like.

FIG. 9 shows a scene viewed in the viewfinder after zooming.

Indicators 84, 85 and 86 are formed by light emitting diodes or the like. The indicator 84 is lit when an electronic flash unit has been charged. The indicator 85 is lit when object distance has been measured for autofocusing. The indicator 86 is lit at the time of the input of the first designated point and extinguished at the time of the input of the second designated point, or goes on and off to give a warning if the calculated focal length is beyond the range in which zooming can be made.

Further, information on the zooming angle or the like is recorded on a film by the recording circuit 16 in FIG. 2. When a photograph is printed off from the film, the record is read out to make printing in accordance with the information. Pseudo-zooming is also available.

Now, referring to a main flowchart in FIG. 10, a zooming operation of the autofocus apparatus for a camera of the present embodiment is described.

First, when the main switch is turned on to feed power, the main microcomputer initializes the operation at step S1 with P_RESET becoming high.

Then, the on/off of the first release switch is determined at step S2. If it is on, a release processing is executed at step S7 to return to step S2. On the other hand, if the first release switch is off, the on/off of the zoom switch is determined at step S3.

If the zoom switch is determined to be on at step S3, a zoom-up processing is executed at step S8 to return to step S2. However, if it is off, the on/off of the zoom-down switch is determined at step S4.

If the zoom-down switch is on, a zoom-down processing is executed at step S9 to return to step S2. However, if it is off, the on/off of the input switch is determined at step S5.

If the input switch is changed from off to on, an autozoom processing is executed at step S10. On the other hand, if it remains off or on, the on/off of the cancel switch is determined at step S6. If the cancel switch is changed from off to on, a cancel processing is executed in a subroutine of the autozoom processing at step S10. However, if it remains off or on, the process returns to step S2.

Referring to a flowchart shown in FIG. 11, the release processing operation is described.

When the process enters the release processing subroutine shown in FIG. 10, "0" is set to a first flag to clear at step S11 and P_RESET is made an "H" level at step 12. Thus, even if the input switch has been pushed for angle detection and the integration has started, the integration is interrupted when the release switch is pushed.

Light and the object distance are measured at step S13, and automatic exposure calculation and autofocus calculation are executed at steps S14 and S15, respectively.

Then, the on/off of the first release switch is determined at step 16. If it is off, the process returns to the main routine. On the other hand, if the first release switch is on, the on/off of the second release switch is determined at step 17. If it is off, the process returns to step S16 to wait for the second release switch becoming on. However, if the second release switch is on, the autofocus lens is driven at step S18, exposure is performed at step S19, the autofocus lens is reset at step S20, the film is wound up by a frame at step S21, and the process returns to the main routine.

Referring to a flowchart shown in FIG. 12A, the zoom-up processing operation at step S8 in FIG. 10 is described. In this camera, the zooming operation is executed with three basic positions of the taking lens being detected: withdrawn, wide, and tele positions. The respective positions are controlled by a zoom photoreflector (ZPR, not shown) and a zoom photointerrupter (ZPI, not shown).

First, "0" is set to a first flag to clear at step S31, and P_RESET is made an "H" level. Thus, even if the input switch has been pushed for angle detection and the integration has started, the integration is interrupted to end the angle detection mode when the zoom button is pushed.

Then, a target position of the zoom-up operation is set at step S33. When the taking lens is driven from the withdrawn to wide position, the wide position is the target position. When manual zoom-up is performed, the tele position is the target position.

The zoom motor is normally rotated at step S34 to start the zoom-up drive. Then, it is determined at step S35 whether the taking lens is being driven from the withdrawn to wide position or not. If yes, it is determined at step S37 whether the target position has been reached or not. On the other hand, if the taking lens is not being driven, the on/off of the zoom-up switch is determined at step S36. If the zoom-up switch is off, the zoom motor is stopped at step S43 to end the zoom-up operation. If the zoom-up switch is on at step S36, it is determined at step S37 whether the present zoom position has reached the target position.

If it has not reached the target position, a CPO pulse outputted from the zoom photointerrupter is determined at step S38. If there has not been an edge, the process proceeds to step S40. However, if there has been an edge, the counter value ZMPLS indicating the zoom position is increased by "1" at step S39.

Next, it is determined at step S40 whether the taking lens is being driven from the withdrawn to wide position or not. If yes, it is determined at step S44 whether the output signal of the zoom photoreflector ZPR has had a falling edge or not.

If there has been no falling edge at step S44, the process returns to step S34 to continue the zoom-up operation. However, if there has been a falling edge, the counter value ZMPLS indicating the zoom position is reset by wide reset data WRPLS at step S45 to return to step S34. With this operation, even if the previous ZMPLS does not correspond to the real zoom position for some reason, ZMPLS is reset to the changing position information of the signal of the zoom photoreflector ZPR indicating the absolute zoom position whereby the amount of difference becomes zero.

On the other hand, if the taking lens is not being driven from the withdrawn to wide position at step S40, it is determined at step S41 whether the output signal of the zoom photoreflector ZPR has had a rising edge or not. If there has been no rising edge, the process returns to step S34. However, if there has been a rising edge, ZMPLS is reset by tele reset data TRPLS at step S42 to return to step S34 and continue the zoom-up operation.

If the present zoom position has reached the target position at step S37, the process goes to step S43 to stop the zoom motor and end the zoom-up operation.

FIG. 12B shows a relationship between the output signals of the zoom photointerrupter ZPI and the zoom photoreflector ZPR, the counter value ZMPLS, and the actual zoom positions: the withdrawn, wide, and tele positions, mentioned with reference to the flowchart in FIG. 12A.

Referring to a flowchart shown in FIG. 13A, the zoom-down processing operation at step S9 in FIG. 10 is described.

First, "0" is set to a first flag to clear at step S51, and P_RESET is made an "H" level. Thus, even if the input switch has been pushed for angle detection and the integration has started, the integration is interrupted to end the angle detection mode when the zoom button is pushed.

Then, a target position of the zoom-down operation is set at step S53. When the taking lens is withdrawn to the withdrawn position, the withdrawn position is the target position. When manual zoom-down is performed, the wide position is the target position.

The zoom motor is reversely rotated at step S54 to start the zoom-down drive. Then, it is determined at step S55 whether the taking lens is being withdrawn to the withdrawn position or not. If yes, the process proceeds to below-mentioned step S57. On the other hand, if the taking lens is not being withdrawn, the on/off of the zoom-down switch is determined at step S56. If the zoom-down switch is off, the zoom motor is stopped at step S63 to end the zoom-down operation. If the zoom-down switch is on, it is determined at step S57 whether the present zoom position has reached the target position. If yes, the process proceeds to step S63 to stop the zoom motor to end the zoom-down operation. On the other hand, if it has not reached the target position, it is determined at step S58 whether there has been an edge of the CPO pulse.

If there has not been an edge, the process proceeds to below-mentioned step S60. However, if there has been an edge, the counter value ZMPLS indicating the zoom position is decreased by "1" at step S59.

Next, it is determined at step S60 whether the taking lens is being withdrawn to the withdrawn position or not. If no, the process returns to step 54 to continue the zoom-down operation. However, if the taking lens is being withdrawn, it is determined at step S61 whether the output signal of the zoom photoreflector ZPR has had a rising edge or not.

If there has been no rising edge, the process returns to step S54. However, if there has been a rising edge, the counter value ZMPLS indicating the zoom position is reset by wide reset data WRPLS at step S62 to return to step S54. With this operation, even if the previous ZMPLS does not correspond to the real zoom position for some reason, ZMPLS is reset to the changing position information of the signal of the zoom photoreflector ZPR indicating the absolute zoom position whereby the amount of difference becomes zero.

If the present zoom position has reached the target position at step S57, the process goes to step S63 to stop the zoom motor and end the zoom-down operation.

FIG. 13B shows a relationship between the output signals of the zoom photointerrupter ZPI and the zoom photoreflector ZPR, the counter value ZMPLS, and the actual zoom positions: the withdrawn, wide, and tele positions, mentioned with reference to the flowchart in FIG. 12A.

Referring to a flowchart shown in FIG. 14, the autozoom processing operation at step S10 in FIG. 10 is described.

First, the on/off of the cancel switch is determined at step S71. If the cancel switch is on, "0" is set to a first flag at step S72 and P_RESET is made an "H" level at step S73 to turn on the analog switch 65 to discharge the integrating circuit 66 for initialization.

On the other hand, if the cancel switch is off at step S71, it is determined at step S74 whether the first flag is "1" or not.

If the first flag is not "1", "1" is set to the first flag at step S75 and P_RESET is made an "L" level at step S76 to turn off the analog switch 65 to operate the integrating circuit and the process returns. On the other hand, if the first flag is "1" while the cancel switch is off, P_RESET is made an "H" level at step S77 to end the integration and analog-to-digital conversion is performed at step S78. The obtained angle is converted to a corresponding focal length in Table 1 at step S79 to obtain a target value and zooming is effectuated according to the target value at step S80.

The zoom-up and zoom-down operations at step S80 are performed in accordance with the flowcharts shown in FIGS. 12A and 13A.

Then, "0" is set to the first flag to clear at step S81.

TABLE 1

| Horizontal | Focal Length (mm) | | |
|---|---|---|---|
| angle | Standard size | Panorama size | HI-Vision size |
| 64° | 28 | xα | xβ |
| 53° | 35 | | |

TABLE 1-continued

| Horizontal angle | Focal Length (mm) | | |
|---|---|---|---|
| | Standard size | Panorama size | HI-Vision size |
| 42° | 45 | | |
| 39° | 50 | | |
| 23°50' | 85 | | |
| 19°30' | 105 | | |
| 15° | 135 | | |

This correspondence table may be stored as a ROM table in the main microcomputer or calculated each time. Table 1 is a table representing the correspondence between the angle of view of the camera and the focal length which can be obtained by the following equation:

$$y = f \tan\theta$$

where 2y is the length of the diagonal of the scene to be photographed, f is the focal length, and 2θ is the angle of view.

Although the focal length f can be obtained from the angle of view in the diagonal direction, here is listed the values for the horizontal direction in view of the photographing in the panorama size and hi-vision size. The focal lengths for the panorama size and hi-vision size are the focal lengths for the standard size multiplied by coefficients α and β, respectively.

If the value obtained as described above goes beyond the focal length at the wide or tele position, the focal length at the wide or tele position is substituted for the obtained value, or an alarm is given.

As described above, the autozoom apparatus for a camera according to this embodiment can make automatic zooming by using a detecting means for detecting the amount of displacement due to the rotation of the camera to accurately calculate the focal length only by designating two points in the picture frame.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An autozoom camera having a zoom lens, comprising:
   manual operating means for inputting information on an angle of view to be photographed;
   angular displacement detecting means for detecting an amount of angular displacement of the camera when the manual operating means is operated;
   focal length determining means for determining a focal length of the zoom lens on the basis of the amount of angular displacement detected by the displacement detecting means; and
   driving means for driving the zoom lens on the basis of the focal length determined by the focal length determining means.

2. The autozoom camera of claim 1, in which the manual operating means inputs information on two points indicating a diagonal of the angle of view to be photographed.

3. The autozoom camera of claim 1, further comprising an operating member for canceling the information on the angle of view inputted by the manual operating means.

4. The autozoom camera of claim 1, in which the camera further comprises a camera shake compensating device for compensating a camera shake and having a sensor for detecting the camera shake, and the angular displacement detecting means also comprises the sensor of the camera shake compensating device.

5. The autozoom camera of claim 1, further comprising means for indicating an alarm when the focal length determined by the focal length determining means is outside the variable adjusting range of the focal length of the zoom lens.

6. The autozoom camera of claim 1, further comprising means for indicating that the information on the angle of view to be photographed is being inputted by the manual operating means.

7. The autozoom camera of claim 1, further comprising means for canceling the detection of the amount of displacement by the displacement detecting means when an operating member other than the manual operating means is operated before the input of the information on the angle of view by the manual operating means is completed.

8. A camera having a zoom lens, comprising:
   angular displacement detecting means for detecting displacement of the camera in a predetermined direction;
   designating means for designating first and second points defining a picture frame;
   focal length determining means for determining the focal length covering the picture frame designated by the designating means, on the basis of the amount of angular displacement detected by the displacement detecting means while the camera is rotated between the two points designated by the designating means;
   focal length detecting means for detecting the focal length of the zoom lens; and
   zoom lens driving means for driving the zoom lens on the basis of the focal length detected by the focal length detecting means so that the focal length of the zoom lens is equal to the focal length determined by the focal length determining means.

9. The camera of claim 8, in which said angular displacement detecting means also acts as a sensor for sensing any camera shake and means for compensating for any such shake.

10. The camera of claim 8, further comprising means for indicating that the amount of displacement between the first and second points is being detected.

11. The camera of claim 8, further comprising means for giving an alarm when the picture frame defined by the first and second points goes beyond the tele or wide position of the focal length.

12. The camera of claim 8, further comprising means for stopping the detection of the amount of displacement by the displacement detecting means when a switch input is made after the first point is designated and before the second point is designated.

13. The camera of claim 8, in which the displacement detecting means detects the amount of displacement such that the first point is designated by the designating means with the camera directed in a first direction and then the second point is designated with the camera directed in a second direction.

14. An autozoom camera having a zoom lens, comprising:
   displacement detecting means for detecting an amount of angular displacement of the camera representing an angle of view to be photographed; and
   lens driving means for driving the zoom lens on the basis of the amount of angular displacement so that the focal length of the zoom lens corresponds to the angle of view to be photographed.

15. The autozoom camera of claim 14, in which the camera further comprises a manual operating member for designating the angle of view to be photographed, and the displacement detecting means detects the amount of displacement when the angle of view is designated by the manual operating member.

16. The autozoom camera of claim 14, in which the camera further comprises a camera shake compensating device for compensating a camera shake and having a sensor for detecting the camera shake, and the displacement detecting means also comprises the sensor of the camera shake compensating device.

17. An angle-of-view inputting apparatus for a camera having a zoom lens, comprising:
input means for inputting a point corresponding to a picture frame to be photographed;
detecting means for detecting an amount of angular movement of the camera in response to the input operation by the input means;
focal length determining means for determining a focal length corresponding to the picture frame on the basis of the amount of angular movement of the camera detected by the detecting means; and
lens driving means for driving the zoom lens in accordance with the focal length determined by the focal length determining means.

18. The angle-of-view inputting apparatus of claim 17, in which the focal length determining means has a table for storing the focal length corresponding to the picture frame and determines the focal length by referring to the table.

19. The angle-of-view inputting apparatus of claim 17, in which the focal length determining means determines the focal length by calculation from the picture frame.

20. An autozoom apparatus for a camera having a zoom lens, comprising:
an angular velocity sensor for generating an output in response to any angular movement of the camera;
operating means for defining a scene to be photographed by designating two corner points on a diagonal of the scene;
integrating means for integrating the output of the angular velocity sensor while the two corner points are designated by the operating means and for outputting an integration result;
focal length determining means for detecting an angle of view of the camera from the integration result and determining a focal length of the zoom lens on the basis of the detected angle of view; and
driving means for driving the zoom lens on the basis of the focal length determined by the focal length determining means.

21. The autozoom apparatus of claim 20, in which the angular velocity sensor comprises a sensor which is also used for detecting a camera shake to compensate the camera shake.

22. The autozoom apparatus of claim 20, further comprising means for indicating an alarm when the focal length determined by the focal length determining means is outside the range of the focal length of the zoom lens.

23. The autozoom apparatus of claim 20, further comprising means for stopping the integration when a further operating means is operated while the two corner points are being designated.

24. An autozoom apparatus for a camera having a zoom lens, comprising:

an angular velocity sensor for generating an output;
focal length determining means for integrating the output of the angular velocity sensor to detect an angle through which the camera has been rotated and for determining a focal length of the zoom lens on the basis of the detected angle; and
driving means for driving the zoom lens on the basis of the focal length determined by the focal length determining means.

25. The autozoom apparatus of claim 24, in which the angular velocity sensor comprises a sensor which is also used for detecting a camera shake to compensate the camera shake.

26. The autozoom apparatus of claim 24, further comprising means for indicating an alarm when the focal length determined by the focal length determining means is outside the range of the focal length of the zoom lens.

27. The autozoom apparatus of claim 24, further comprising means for stopping the integration when a further operating means is operated while the focal length determining means is integrating the output of the angular velocity sensor.

28. A camera having a zoom lens, comprising:
operating means for designating an angle of view to be photographed;
rotation detecting means for detecting an amount of rotation of the camera when the operating means is operated;
focal length determining means for determining a focal length of the zoom lens on the basis of the amount of rotation detected by the rotation detecting means; and
driving means for driving the zoom lens on the basis of the focal length determined by the focal length determining means.

29. The camera of claim 28, in which the operating means designates two points in the angle of view.

30. The camera of claim 28, in which the rotation detecting means comprises means f or detecting an angular velocity and an integrating circuit and detects the amount of rotation of the camera by calculating an angle through which the camera is swung while the angle of view is designated by the operating means.

31. The camera of claim 30, in which the means for detecting an angular velocity is an angular velocity sensor.

32. The camera of claim 28, further comprising means for magnetically recording the amount of rotation on a film to which a magnetic material is applied.

33. The camera of claim 28, further comprising means for magnetically recording a focal length on a film to which a magnetic material is applied.

34. A camera having a zoom lens, comprising:
operating means for designating an angle of view to be photographed;
displacement detecting means for detecting an amount of angular displacement of the camera when the operating means is operated, the angular displacement detecting means comprising a sensor which is also used for detecting a camera shake to compensate the camera shake;
focal length determining means for determining a focal length of the zoom lens on the basis of the amount of displacement detected by the displacement detecting means; and
driving means for driving the zoom lens on the basis of the focal length determined by the focal length determining means.

35. The camera of claim 34, in which the displacement detecting means comprises an x-axis displacement detecting circuit and a y-axis displacement detecting circuit, each of the detecting circuits comprising an angular velocity sensor and an integrating circuit.

36. The camera of claim 34, in which the sensor is an angular velocity sensor, the angular velocity is once integrated to become a signal representing an angular displacement, and a rotation angle of the camera is detected.

37. The camera of claim 34, in which the sensor is a vibration gyro.

38. A camera having a zoom lens, comprising:

operating means for designating an angle of view to be photographed;

angular displacement detecting means for detecting an amount of angular displacement of the camera when the operating means is operated;

focal length determining means for determining a focal length of the zoom lens on the basis of the amount of displacement detected by the angular displacement detecting means;

driving means for driving the zoom lens on the basis of the focal length determined by the focal length determining means; and alarm means for giving an alarm when the angle of view designated by the operating means is outside the angle of view of the zoom lens.

39. The camera of claim 38, in which the alarm means gives the alarm visually or acoustically when the focal length determined by the focal length determining means exceeds the tele or wide position of the zoom lens.

* * * * *

UNITED STATES PATENT AND TRADEMARK OFFICE
CERTIFICATE OF CORRECTION

PATENT NO.  : 5,752,094
DATED       : May 12, 1998
INVENTOR(S) : Motoko Tsutsumi and Minoru Hara It is certified that error appears in the above-indentified patent and that said Letters Patent is hereby corrected as shown below:

On the title page, item [54] and Column 1, line 1:
  Please chage the Title of the Invention from "AUTOZOON APPARATUS FOR CAMERA" to --AUTOZOOM APPARATUS FOR CAMERA--.

Signed and Sealed this

Eighteenth Day of August, 1998

Attest:

BRUCE LEHMAN

Attesting Officer          Commissioner of Patents and Trademarks